Figure 1:
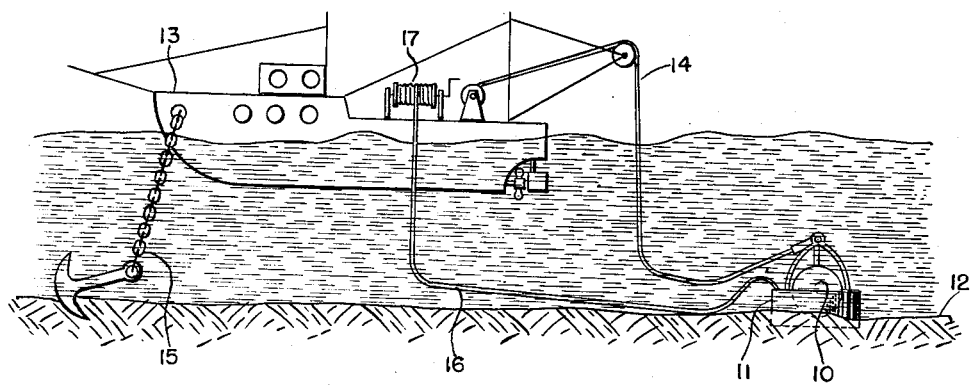

April 13, 1954    J. F. EVANS    2,674,886
SELF-LEVELING INSTRUMENT MOUNTING
Filed Aug. 17, 1949

*INVENTOR:*
Julian F. Evans
BY *Newell Pottorf*
Attorney

Patented Apr. 13, 1954

2,674,886

UNITED STATES PATENT OFFICE 2,674,886

SELF-LEVELING INSTRUMENT MOUNTING

Julian F. Evans, Tulsa, Okla., assignor to Stanolind Oil and Gas Company, Tulsa, Okla., a corporation of Delaware Application August 17, 1949, Serial No. 110,855

4 Claims. (Cl. 73—382)

This invention relates to instrument mountings of the self-leveling type, and is directed particularly to a self-leveling mounting suitable for a gravity meter such as is used in marine geophysical surveying.

In the application of the gravity meter to geophysical surveying for petroleum in marine areas, it has so far been necessary to place the instrument on the floor of the body of water for the reason that sufficient sensitivity cannot ordinarily be obtained with meters capable of being read on a moving platform, such as is provided by a vessel. These submersible gravity meters are, in general, of two types: either a conventional land gravity meter mounted inside a diving bell which also allows space for an observer to be lowered along with the meter to the bottom of the water; or a remote-control type of meter in which the instrument is placed in a water-tight container and lowered to the marine bottom, with the various controls being provided by suitable electrical or other connections extending from the transporting vessel at the water's surface. It is to the latter type that the present invention is especially applicable.

It is in connection with such remotely controlled gravity meters that problems of accurately and quickly leveling the instrument after it has come to rest on the marine floor have arisen. Remotely controlled leveling devices, operated by electric motors and indicating at the surface, have been used; but these add considerably to the bulk and complexity of the surface and subsurface equipment. A further difficulty with motor-operated leveling devices, either manually or automatically controlled, is that a combination of fine adjustment and fast operation is difficult to achieve. Gimbal mounting of the gravity meter instrument has been tried, but because of the accuracy necessary to be obtained in the leveling process, very small frictional effects in the gimbal bearings and similar defects of pivoting of the suspended system have introduced errors.

It is accordingly a primary object of my invention to provide an improved and simple suspension system for very accurately and rapidly self-leveling an instrument such as a gravity meter used in marine work. Another object is to provide, for a marine gravity meter, a particular type of suspension which provides simultaneously both support and damping, permitting the use of very delicate pivots without danger of damage thereto together with viscous damping which very quickly brings the gravity-meter container to rest in a truly level position. A further object of the invention is a gravity meter suspension of the type described, including means for establishing electrical circuits to the suspended gravity meter without introducing frictional effects or torques which interfere with its accurate leveling. Other objects, uses, and advantages of the invention will become apparent as the description proceeds.

The foregoing and other objects of my invention are attained in a suspension system which may be generally described as a pair of members, preferably in the form of concentric spherical bowls, with the gravity meter located inside of the inner bowl and a body of liquid, more or less buoyantly supporting the inner bowl and its load located between it and the outer bowl. The pivoting of the inner spherical bowl is as nearly as possible at the geometrical center of the two concentric spherical surfaces. By making the buoyancy of the fluid as nearly as possible equal to the weight of the suspended system, and by providing a fluid of chosen relatively constant viscosity, both buoyancy and damping of the inner spherical bowl containing the gravity meter are accomplished, and the pivoting can be provided by very delicate bearings. Further, if these bearings are defective in any manner, so that normal leveling would be interfered with, the buoyancy of the fluid acts on the system in the proper direction to restore the level to the proper value.

Figure 2:
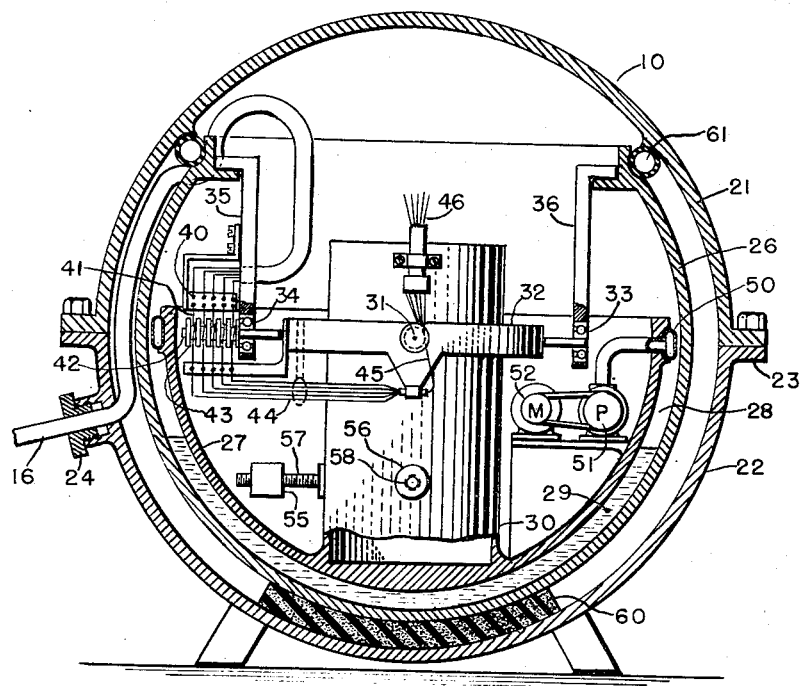

This will be better understood by reference to the accompanying drawings showing an illustrative embodiment of the invention, in which the same numerals in the different figures refer to the same or corresponding parts. In the drawings:

Figure 1 shows a gravity meter mounted in accordance with the invention as it is used in a body of water, shown in cross-section, and Figure 2 shows in detail a cross-section of the spherical mounting of the gravity meter.

Referring now to these drawings, and to Figure 1 in particular, the gravity meter is carried within a spherical container 10, mounted on a horizontal framework 11 which rests upon and digs into the soft mud of the marine floor 12, providing a stable support for the gravity meter. In use, this assembly is manipulated from a transporting vessel 13 by means of a lifting cable 14, the vessel being held at a reading location by an anchor and chain 15. The gravity meter within container or housing 10 is remote-controlled from the vessel 13 by a multiple-conductor, insulated electric cable 16, payed out from a reel 17 on the vessel when the assembly is lowered to the marine floor 12.

Referring now to Figure 2, the submersible spherical unit 10 comprises the two hemispherical shells 21 and 22 sealed and held together by a flange 23. The electrical multiple-conductor cable 16 passes through an opening in the shell 22 sealed by a waterproof packing gland 24. Although this spherical housing 10 is probably the most desirable shape to withstand high hydrostatic pressures, and fits the equipment inside it most compactly, it could be of any other shape, if desired for specific reasons.

Within the watertight spherical shell thus provided is the gravity meter self-leveling mounting comprising an outer spherical bowl 26, and an inner spherical bowl 27 separated therefrom by a narrow space 28 partly filled by a viscous fluid 29. Fixed to the inside of inner bowl 27 is a which may be a conventional type of meter used for surveying on land, with "Selsyn" motor remote controls substituted for the various manual controls. As the particular form of this meter is unimportant in the present invention, no further description of it is considered necessary or will be given. Also, it will be observed that only the bowl surfaces contacted by the liquid 29 need be truly spherical. The other surfaces may be of any form desired and are typically only roughly spherical, as the surface of a casting.

The mounting of gravity meter container 30 fixed to the inner bowl 27 comprises the gimbal ring inner bearing 31, the gimbal ring 32, and the gimbal ring outer bearings 33 and 34, respectively carried by downwardly projecting arms 35 and 36 on the outer bowl 26. The two axes of rotation defined by the gimbal bearings 31, 33, and 34 lie as nearly as possible in a plane with the point of intersection of the axes being as exactly as possible at the geometrical center of the outer surface of inner bowl 27, which is the same point as the center of the inside surface of the outer bowl 26.

With this arrangement, and having a gravity meter in the container 30, it and the spherical bowl 27 will rotate about the gimbal suspension point until the center of gravity is directly beneath. Since this rotation will not vary in any distinguishable amount the depth of submergence of the bowl 27 in the fluid 29, as the volume of the space 28 remains constant for all position of the inner bowl 27 relative to outer bowl 26, it will be seen that the buoyant force of liquid 29 on the inner bowl 27 will never vary. Consequently, the suspended system (container 30 and bowl 27) is as free to level itself in the liquid as a pendulum suspended in air or vacuum. On the other hand, the liquid 29 in the space 28 exerts a very beneficial damping action due to its viscosity, so that the inner bowl 27 is very rapidly brought to rest relative to the outer bowl 26. Further, as a substantial portion, or preferably all of the support of the inner bowl 27 and gravity meter in container 30 can be provided by the buoyancy of fluid 29, gimbal bearings 31, 33, and 34 can be extremely delicate and sensitive, their primary function being thus to hold the inner bowl centered within the outer. The buoyancy of the fluid 29 in this arrangement has a still further beneficial effect in that if in any way the pivot bearings become damaged so that the pivoting is displaced to one side or another from the exact center of the spherical bowl surfaces, the torque of the buoyancy is in the opposite direction from the torque of the suspended mass about the displaced pivot point. For example, assume that the pivots are completely shifted to the right-hand edge of the inner bowl 27. The suspended system would experience a torque in a counterclockwise direction about the new pivot point. However, the buoyancy in the fluid 29 creates a clockwise opposing torque, which is exactly equal if the suspended system is exactly buoyantly supported. Consequently, leveling errors due to defective pivoting can be almost or even completely eliminated.

Of interest to this suspension also is the manner of establishing electrical connections to the delicately suspended gravity meter within the container 30 without introducing torques which interfere with leveling of the container and bowl 27. This is accomplished preferably by bringing the separate electrical leads within the cable 16 out to a stationary mounting strip 40, from which each lead is extended by a hair spring 41 to an insulated connecting point on an extension 42 of the outer gimbal shaft. These hair springs 41 are highly resilient and are kept from contacting each other by thin discs of insulation 43. A bundle of insulated leads 44 carries the electrical circuits from the tips of hair springs 41 around the gimbal bearing 34 to the gimbal ring 32, whence the circuits are transferred by a similar set of hair springs 45 to the inner gimbal shaft through the gimbal bearing 31, and thence to a conductor bundle 46 mounted on the casing 30. In this manner electrical connections are carried past the delicate gimbal bearings without introducing difficulties due to sliding friction of slip rings and the like, which could prevent proper leveling of the instrument.

It will be noted that considerable free space is provided around the support arms 35 and 36 by making the outer bowl taller than the inner so that the inner bowl 27 can swing through a considerable angle. The instrument mounting is thus adapted to be set upon a marine bottom 12 having considerable tilt. In order to prevent splashing or leakage of fluid 29 out of the space 28, as well as to prevent swinging of the inner bowl 27 during handling, the rim of inner bowl 27 is provided with a collapsible pneumatic tube 50 inflated or deflated at will by a pump 51 driven by a motor 52 remotely controlled through the cable 16. When inflated, tube 50 both seals against the inner surface of outer bowl 26 and holds the inner bowl 27 clamped to it. When deflated, as shown, the inner bowl swings freely.

In order to bring instrument holder 30 and inner bowl 27 to the desired position for leveling the gravity meter in holder 30, a pair of weights 55 and 56 movable along screws 57 and 58 fixed to the gimbal-suspended assembly are provided.

The outer bowl 26 is preferably shock-mounted within the pressure shells 21 and 22 by a cushion of sponge rubber 60 at the base of shell 22 and a resilient rubber ring 61 between the shell 21 and the open top of the bowl 26. A highly desirable type of fluid 29 for partially filling the space 28 between the bowls is one of the recently developed silicones having a substantially constant viscosity with varying temperature, as well as greater specific gravity than many fluids. However, I have found that ordinary automotive lubricating oils of such viscosities as SAE–30 or –40 are also suitable for this use, although in such event the suspended system may be only partially buoyancy-supported. Complete support of the system by oil is, of course, possible by sufficiently enlarging the size of the inner and outer spherical bowls.

While I have described my instrument mounting in connection with a marine type of gravity meter, it is to be understood that it is also useful in connection with other types of instruments requiring very accurate leveling, either on water or land, and it is also apparent that modifications and variations may be made of the principle of operation which has been described. The invention, therefore, should not be considered as limited to the exact details of the described embodiment, but is to be ascertained from the scope of the appended claims.

I claim:

1. A self-leveling mounting for a gravity meter comprising an outer spherical bowl having a smooth inner surface, a pendulous inner spherical bowl of smaller diameter than said outer bowl and having a smooth outer surface, a gimbal mounting pivotally connecting said inner bowl concentrically within said outer bowl, the axes of rotation of the gimbal bearings intersecting at a point which is the geometrical center of the concentric spherical surfaces of said bowls, a body of liquid only partially filling the space between the bowls and at least partially buoyantly supporting the weight of the gimbal-suspended system, and a gravity-meter holder fixed within said inner spherical bowl.

2. A self-leveling mounting for a gravity meter comprising an outer member having a smooth inside surface of spherical form, a pendulous inner member having a smooth outside surface of spherical form of smaller diameter, a gimbal mounting suspending said inner member within said outer member with said inside and outside surfaces concentric and leaving a space of uniform width between them, a liquid only partially filling the space between said surfaces and substantially entirely buoyantly supporting said inner member, and a gravity-meter holder fixed within said inner member.

3. A self-leveling mounting for an instrument requiring a plurality of electrical leads comprising an outer member having an inside surface of spherical form, an inner member having an outside surface of spherical form of smaller diameter than said inside surface, a gimbal ring pivoted to said outer member, said inner member being pivoted to said ring so that said surfaces are concentric, leaving a space of uniform width between them, a liquid partially filling said space and at least partially buoyantly supporting said inner member, three groups of insulated electrical leads fixed respectively to said outer member, to said ring, and to said inner member, a highly resilient spring connecting each of said leads on said outer member to a corresponding lead on said ring, a similar spring connecting each of the leads on said ring with a corresponding lead on said inner member, and an instrument holder fixed within said inner member.

4. A self-leveling instrument mounting comprising an outer spherical bowl, an inner spherical bowl of smaller diameter and substantially less height than said outer bowl, a gimbal mounting concentrically suspending said inner bowl within said outer bowl and leaving a space of uniform width between them, a body of liquid partially filling said space, clamping means fixed on said inner bowl and adapted both to contact said outer bowl across said space and to confine said liquid within said space, means for actuating said clamping means, and an instrument holder fixed to said inner bowl.

References Cited in the file of this patent

UNITED STATES PATENTS

| Number | Name | Date |
|---|---|---|
| 2,179,467 | Cox | Nov. 7, 1939 |
| 2,260,396 | Otto | Oct. 28, 1941 |
| 2,384,739 | Hasbrook | Sept. 11, 1945 |
| 2,500,410 | Hewitt | Mar. 14, 1950 |
| 2,513,044 | Page | June 27, 1950 |

FOREIGN PATENTS

| Number | Country | Date |
|---|---|---|
| 311,426 | Germany | Mar. 21, 1919 |